US005490417A

United States Patent [19]

Nakajima

[11] Patent Number: 5,490,417

[45] Date of Patent: Feb. 13, 1996

[54] METHOD OF DETERMINING AIR DENSITY FOR INTAKE AIR OF AUTOMOBILE ENGINE

[75] Inventor: Yoshinori Nakajima, Tokyo, Japan

[73] Assignee: Fuji Jukogyo Kabushiki Kaisha, Tokyo, Japan

[21] Appl. No.: 300,856

[22] Filed: Sep. 6, 1994

[30] Foreign Application Priority Data

Sep. 30, 1993 [JP] Japan .................................... 5-244719

[51] Int. Cl.⁶ .................................................. G01M 15/00

[52] U.S. Cl. .......................................... 73/118.2; 73/117.3

[58] Field of Search .................................... 73/116, 117.3, 73/118.2, 119 A

[56] References Cited

U.S. PATENT DOCUMENTS 5,191,789 3/1993 Furuya .................................. 73/118.2

5,293,553 3/1994 Dudek et al. .......................... 73/118.2

5,339,681 8/1994 Sekozawa et al. ...................... 73/118.2

*Primary Examiner*—Richard Chilcot

*Assistant Examiner*—Max H. Noori

*Attorney, Agent, or Firm*—Beveridge, DeGrandi, Weilacher & Young

[57] ABSTRACT

A method for determining the air density of intake air into an engine without using an additional hard ware like an atmospheric pressure sensor, An average basic fuel injection amount and an average throttle opening angle are obtained when the engine is in a first predetermined condition and when it is in a second predetermined condition, respectively. Based on these average basic fuel injection amonut data and average throttle opening angle data, a determination parameter is calculated, The determination parameter thus calculated is employed for a parameter from which an air density value is obtained or for a parameter from which it is judged whether the engine is operated in high altitude or not.

12 Claims, 3 Drawing Sheets

METHOD OF DETERMINING AIR DENSITY FOR INTAKE AIR OF AUTOMOBILE ENGINE

BACKGROUND OF THE INVENTION

The present invention relates to a method of determining the air density of intake air for an automobile engine.

When an automobile runs in a high altitude area, there occur drops in power, hard startings of engine, misfirings, knockings and the like because of a lower density of intake air, namely a smaller mass airflow admitted into the engine, than when it runs in a sea level area.

Commonly, in order to prevent these troubles in engines, countermeasures are taken so as to correct control parameters of engines according to the altitude where vehicles are operated by means of an equipment such as an atmospheric pressure sensor.

In a recent example of a technology not employing the costly atmospheric pressure sensor, as disclosed in Japanese Patent Application Laid Open No. 1991-185250, there is a proposed technique that an altitude judgment is made based on an air amount ratio between an actual air amount and a desired air amount which is calculated from the standard air amount data predetermined according to the throttle opening angle or the standard air amount data predetermined according to both the throttle opening angle and the engine speed.

However, the abovementioned technique using an air amount ratio between an actual air amount and a desired air amount has generally a tendency that the change of an actual intake air amount is too slow to respond to the change of the throttle opening angle when a parameter representing an air density is calculated based on the intake air amount admitted into the engine at the transient operating condition and consequently the actual amount of air corresponding to the throttle opening angle is read to be too small. As a result of this, the parameter representing an air density becomes smaller than an actual air density, and therefore not only an engine control based on the altitude judgment but also an engine control based on the air density come out of a proper control range due to erroneous air density data. That is to say, in this technique using the air amount ratio, it becomes difficult to measure a correct air density even under the same atmospheric pressure, when the vehicle runs at the rapidly changing operational condition.

SUMMARY OF THE INVENTION

Taking foregoing disadvantages into consideration, the present invention has been made.

An object of the present invention is to provide a method of determining an air density of intake air admitted into an automobile engine without using an additional hard ware like an atmospheric pressure sensor.

Another object of the present invention is to provide a method of determining an accurate air density of the intake air under any operating condition of the engine.

According to one aspect of the present invention, there is provided a method of determining an air density of intake air admitted to an engine including an electronically controlled fuel injection system and a throttle valve for adjusting an amount of said induction air, the method comprising the steps of:.

detecting a first predetermined operating condition composed of a plurality or engine and vehicle operating conditions;

counting a first detecting time during which the first predetermined operating condition is detected;

detecting a first fuel injection amount each time said first predetermined operating condition is detected and accumulating the first fuel injection amount;

detecting a first throttle opening degree each time the first predetermined operating condition is detected and accumulating the first throttle opening degree;

detecting a second predetermined operating condition composed of a plurality of engine and vehicle operating conditions some or all of which are different from engine and vehicle operating conditions of the first predetermined operating condition;

counting a second detecting time during which the second predetermined operating condition is detected;

detecting a second fuel injection amount each time the second predetermined operating condition is detected and accumulating the second fuel injection amount;

detecting a second throttle opening degree each time the second predetermined operating condition is detected and accumulating the second throttle opening degree;

obtaining a first average fuel injection amount by means of dividing said accumulated first fuel injection amount by the first detecting time when both of the first detecting time and the second detecting time reach a predetermined time;

obtaining a first average throttle opening degree by means of dividing the accumulated first throttle opening degree by the first detecting time when both of the first detecting time and the second detecting time reach a predetermined time;

obtaining a second average fuel injection amount by means of dividing the accumulated second fuel injection amount by said second detecting time when both of said first detecting time and the second detecting time reach a predetermined time;

obtaining a second average throttle opening degree by means of dividing the accumulated second throttle opening degree by the second detecting time when both of the first detecting time and the second detecting time reach a predetermined time;

calculating a ratio of the first average fuel injection amount versus the first average throttle opening angle and designating the ratio as a first parameter;

calculating a ratio of the second average fuel injection amount versus the second average throttle opening angle and designating the ratio as a second parameter;

calculating a ratio of the first average fuel injection amount versus the second average throttle opening angle and designating the ratio as third parameter;

calculating a ratio of the second average fuel injection amount versus the first average throttle opening angle and designating the ratio as a fourth parameter;

calculating a weighted mean of the first parameter, said second parameter, the third parameter and the fourth parameter by multiplying an appropriate weight factor to each of the first, second, third and fourth parameters respectively and designating the weighted mean as a determination parameter; and determining an air density of induction air by referring to a map parameterizing the air density and the determination parameter.

According to another aspect of the present invention, there is provided a method of judging whether or not an engine is operated at high altitude, the method comprising the steps of:

detecting a first predetermined operating condition composed of a plurality of engine and vehicle operating conditions;

counting a first detecting time during which the first predetermined operating condition is detected;

detecting a first fuel injection amount each time the first predetermined operating condition is detected and accumulating the first fuel injection amount;

detecting a first throttle opening degree each time the first predetermined operating condition is detected and accumulating the first throttle opening degree;

detecting second predetermined operating condition composed of a plurality of engine and vehicle operating conditions some or all of which are different from engine and vehicle operating conditions of the first predetermined operating condition;

counting a second detecting time during which the second predetermined operating condition is detected;

detecting a second fuel injection amount each time said second predetermined operating condition is detected and accumulating the second fuel injection amount;

detecting a second throttle opening degree each time the second predetermined operating condition is detected and accumulating the second throttle opening degree;

obtaining a first average fuel injection amount by means of dividing the accumulated first fuel injection amount by the first detecting time when both of the first detecting time and the second detecting time reach a predetermined time;

obtaining a first average throttle opening degree by means of dividing the accumulated first throttle opening degree by the first detecting time when both of the first detecting time and the second detecting time reach a predetermined time;

obtaining a second average fuel injection amount by means of dividing the accumulated second fuel injection amount by the second detecting time when both of the first detecting time and the second detecting time reach a predetermined time;

obtaining a second average throttle opening degree by means of dividing the accumulated second throttle opening degree by said second detecting time when both of the first detecting time and the second detecting time reach a predetermined time;

calculating a ratio of the first average fuel injection amount versus the first average throttle opening angle and designating the ratio as a first parameter;

calculating a ratio of the second average fuel injection amount versus the second average throttle opening angle and designating the ratio as a second parameter;

calculating a ratio of the first average fuel injection amount versus the second average throttle opening angle and designating the ratio as a third parameter;

calculating a ratio of the second average fuel injection amount versus the first average throttle opening angle and designating the ratio as a fourth parameter;

calculating a weighted mean of the first parameter, the second parameter, the third parameter and the fourth parameter by multiplying an appropriate weight factor to each of the first, second, third and fourth parameters respectively and designating the weighted mean as a determination parameter; and judging whether or not the engine is operated in high altitude from a relationship of the determination parameter with an altitude in which the engine is operated.

DETAILED DESCRIPTION OF THE PREFERRED EMBODIMENT

Referring now to the accompanying drawings, an embodiment according to the present invention is described in FIGS. 1 to 4.

Figure 4:
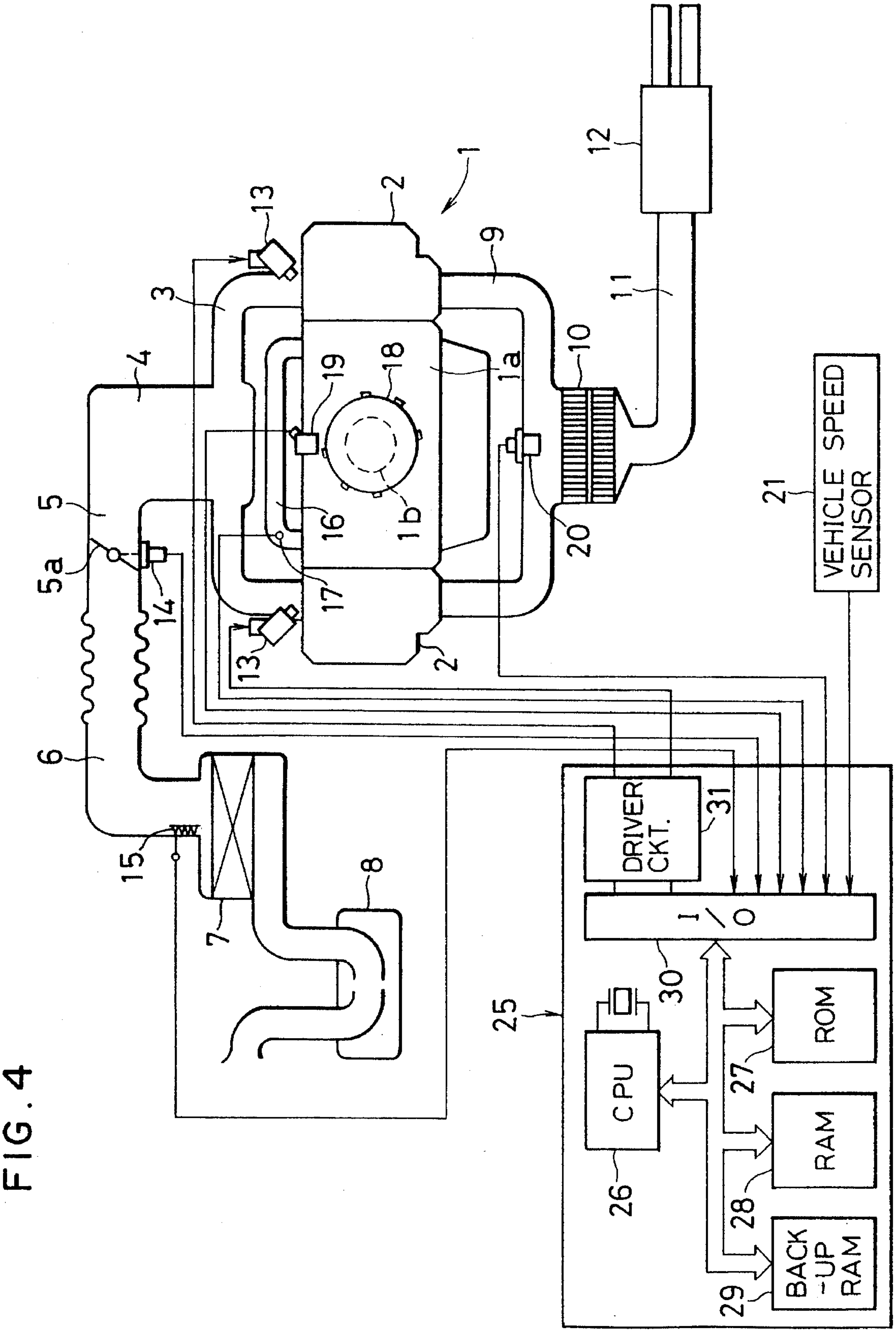
FIG. 4 is a schematic view showing an engine control according to an embodiment of the present invention.

FIG. 4 shows a schematic diagram showing an engine (a horizontally opposed four cylinders engine is shown herein) and an engine control system in which a numeral 1 denotes an engine and a numeral 2 shows a cylinder head. An intake manifold 3 is connected to an intake port formed in the cylinder head 2.

The intake manifold 3 is connected to a throttle chamber 5 via an air chamber 4. The throttle chamber 5 is provided with a throttle valve 5*a* and an air cleaner 7 is disposed upstream of the throttle chamber 5 via an intake air duct 6. Further, a resonator 8 is disposed upstream of the air cleaner 7.

An exhaust manifold 9 is connected to each of exhaust ports formed in the cylinder head 2 and a catalytic converter 10 is provided at a junction of the exhaust manifold 9. Further, from the catalytic converter 10 an exhaust pipe 11 extends to a muffler 12.

The engine 1 is provided with miscellaneous actuators and sensors mentioned hereinafter for controlling the engine 1. These actuators and sensors are connected to an electronic control unit 25 which will be described hereinafter. Specifically, a fuel injector 13 is arranged immediately upstream of the intake port of each cylinder and a throttle sensor 14 is coupled with the throttle valve 5*a*. Further, an air flow sensor (an air flow sensor of the hot wire type is shown herein) 15 is provided immediately downstream of the air cleaner 7 and a coolant temperature sensor 17 is also provided in a coolant passage 16 which communicates the right and left bank of a cylinder block 1*a* of the engine 1.

Furthermore, a crank rotor 18 is coaxially coupled with a crank shaft 1*b* which is rotationally mounted on the cylinder block 1*a* and a crank angle sensor 19 (in FIG. 4, an electromagnetic type of the crank angle sensor is provided so as to detect a protrusion or a slit provided on the periphery of the crank rotor 18 at the position corresponding to a given crank angle) is mounted adjacent to the periphery of the crank rotor 18. Further, an oxygen ($O_2$) sensor 20 is mounted at the junction of the exhaust manifold 9.

On the other hand, a numeral 25 shows an electronic control unit (ECU) which comprises a CPU 26, a ROM 27, a RAM 28, a backup RAM 29, and an I/O interface 30 connecting altogether via a bus line. The ECU 25 is connected to aforementioned actuators, sensors and miscellaneous switches not shown herein in order to control the engine 1.

That is to say, the throttle sensor 14, the air flow sensor 15, the coolant temperature sensor 17, the crank angle sensor 19, the $O_2$ sensor, the vehicle speed sensor 21, and other sensors and switches not shown in this figure are connected to an input port of the I/O interface 30, and on the other hand, the actuators like the fuel injector 13 are connected to an output port of the I/O interface 30 via a driver circuit 31.

The fixed data for miscellaneous controls, such as control programs and tables are memorized in the ROM 27, and the output signals of above sensors or switches and the data calculated by the CPU 26 are memorized in the RAM 28, Further, in the backup RAM 29, the trouble codes for self-diagnosis are stored so as to be held even after the ECU 25 is deenergized. In the CPU 26, the fuel injection amount, the ignition timing and other control parameters are calculated according to the control programs stored in the ROM 27. Further, in the CPU 26, the parameters representing the air density of the induction air are calculated too.

Next, it will be described how the ECU 25 operates in calculating the air density of the induction air.

When a motor vehicle runs in high altitude where the air density is low, a throttle opening angle must be increased to obtain the same power as in low altitude because the mass flow of the induction air becomes small at the same throttle opening angle due to a lowered charging efficiency of the engine in high altitude. Considering that this increased amount of the throttle opening degree comes from a reduced air density, it is easily understood that there is a distinct relationship among the air density, the engine power and the throttle opening angle. The engine power can be digitized as a fuel injection amount $T_p$ and the fuel injection amount $T_p$ is expressed as:

$$T_p = K \times \rho_A \times Q_A / N_E \qquad (1)$$

where K is a constant, $\rho_A$ is an air density, $Q_A$ is air volume, and $N_E$ is an engine revolution number. Further, in the above formula, $Q_A/N_E$ represents an intake air volume per one engine revolution, namely a throttle opening angle ALP of that time.

Consequently, it is basically understood that the value of the basic fuel injection amount $T_p$ divided by the throttle opening degree ALP has a correlation with the air density $\rho_A$ of the intake air.

In order to raise a precision in estimating the air density $\rho_A$, it is of importance to find a parameter having a high correlation with the real air density $\rho_A$. In this embodiment, this parameter is referred to as a determination parameter H5. Further, in the method for air density estimation according to a preferred embodiment, a plurality of approximation parameters scattered around the determination parameter H5 are to be calculated first before H5 is obtained. Then the determination parameter H5 is calculated by averaging all these approximation parameters.

In this embodiment, four approximation parameters, namely H1, H2, H3 and H4 are determined.

Referring to the flow charts in FIG. 1 and FIG. 2, it will be described hereinafter how the approximation parameters are calculated, how the determination parameter is obtained, and how the air density is determined finally.

Figure 1:
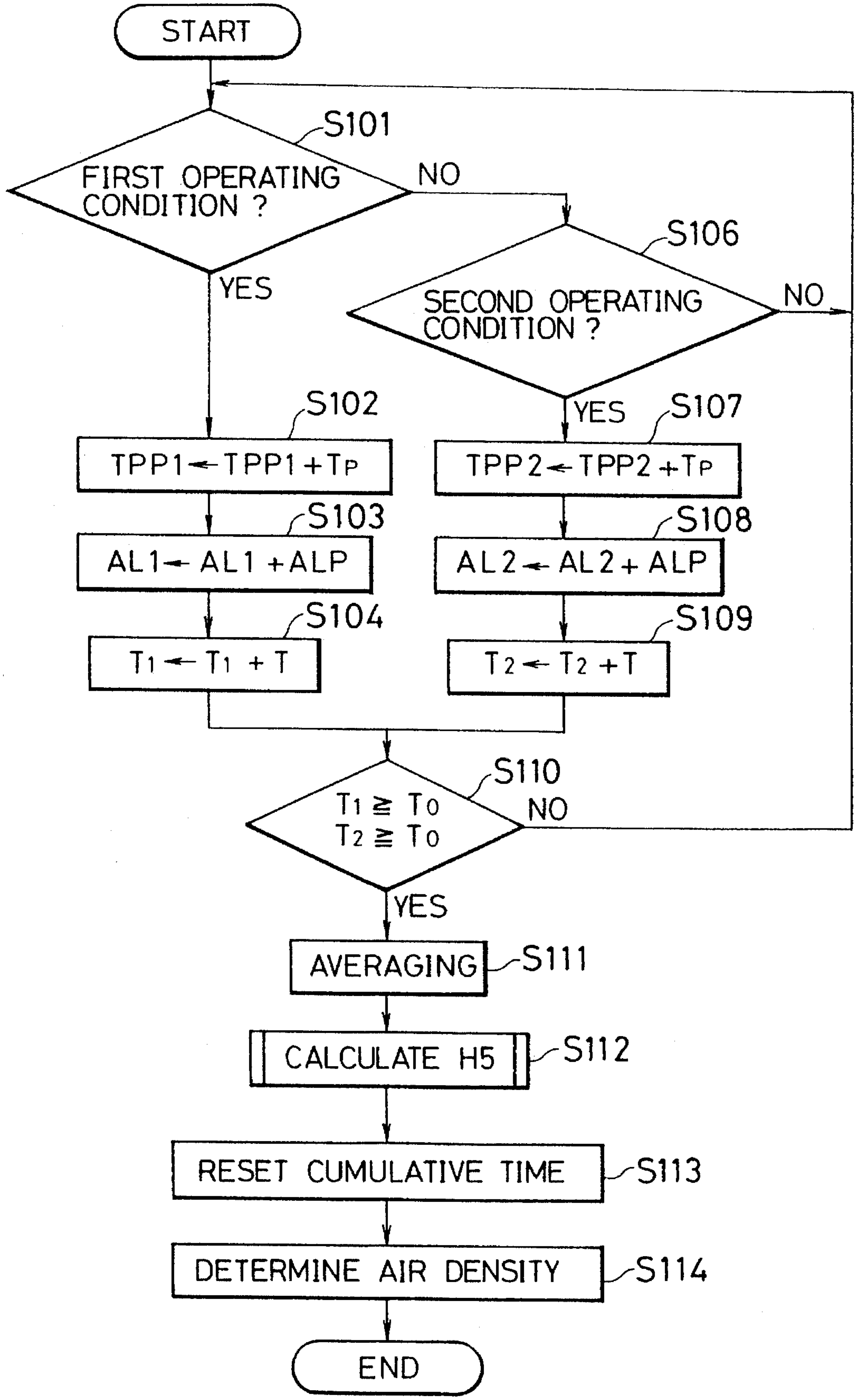
FIG. 1 is a flowchart showing a main routine for determining an air density according to an embodiment of the present invention.

A flow chart in FIG. 1 shows a basic routine for estimating an air density, in which at a step S101 it is investigated whether or not the engine operating condition is in a first predetermined condition. An example of the first predetermined condition is established as follows:

(a) $T_{WS}$>40 degrees centigrade (b) 2.5 msec<$T_p$<5.0 msec (c) 30.0 degrees<ALP<81.6 degrees (WOT)

(d) 20 km/h<V<120 km/h (e) 1600 rpm<$N_E$<5000 rpm where TWS is a coolant temperature at the engine start, $T_p$ is a basic fuel injection amount, ALP is a throttle opening angle, V is a vehicle speed, and $N_E$ is an engine rotational speed.

If the first condition is satisfied, that is to say, all of the conditions from (a) to (e) are met, the program steps to S102 where a cumulative value TPP1 is produced by adding a basic fuel injection amount $T_p$ to the previous cumulative value TPP1 (TPP1=TPP1+$T_p$: an initial value of TPP1 is set to be 0) . At the next step S103 a cumulative value AL1 is produced by adding throttle opening angle ALP of that moment to the previous cumulative value AL1 (AL1=AL1+ALP: an initial value of AL1 is set to be 0) then the program goes to S104 at which a cumulative sampling time T1 is obtained by adding a data sampling time T to the previous cumulative time T1 (T1=T1+T: an initial value of T1 is set to be 0).

On the other hand, if the engine is not judged to be in a first predetermined condition at S101, the program is diverted to S106 where it is checked whether or not the engine is in a second predetermined condition. This second predetermined condition is determined differently from the first predetermined condition with respect to any or all of the conditions from (a) to (e). For example, the condition (c) may be replaced with a condition 10.0 degrees<ALP< 81.6 degrees (WOT) and other conditions may not be changed.

If the engine is judged to be in the second predetermined condition at S106, the program goes to S107 where a cumulative value TPP2 is produced by adding a basic fuel injection amount $T_p$ to the previous cumulative value TPP2 (TPP2=TPP2+$T_p$: an initial value of TPP2 is set to be 0). At the next step S108 a cumulative value AL2 is produced by adding a throttle opening angle ALP of that moment to the previous cumulative value AL2 (AL2=AL2+ALP: an initial value of AL2 is set to be 0) then the program goes to S109 at which a cumulative sampling time T2 is obtained by adding a data sampling time T to the previous cumulative time T2 (T2= T2+T: an initial value of T2 is set to be 0).

On the other hand, if the engine is not in the second condition at S106, the program goes back to S101 and the same process is repeated.

At S110 it is judged whether the cumulative sampling time T1 or T2 reach a predetermined time T0 or not. If T1 or T2 do not reach T0, the process returns to S101 and if T1 or T2 reach T0, the process steps to S111 where the fuel injection amount TPP and the throttle opening angle AL are averaged by the sampling time T. Namely, when the engine is in the first predetermined condition, at S111 each of the cumulative value TPP1 and AL1 within a sampling time T1 is divided by the total sampling time T1 to produce an average basic fuel injection amount TPM1 and an average throttle opening angle ALPM1 at the first engine operating condition, respectively. When the engine is in the second predetermined condition, TPP2 and AL2 are divided by T2 to produce an average basic fuel injection amount TPM2 and an average throttle opening angle ALPM2 at the second engine operating condition.

Figure 2:
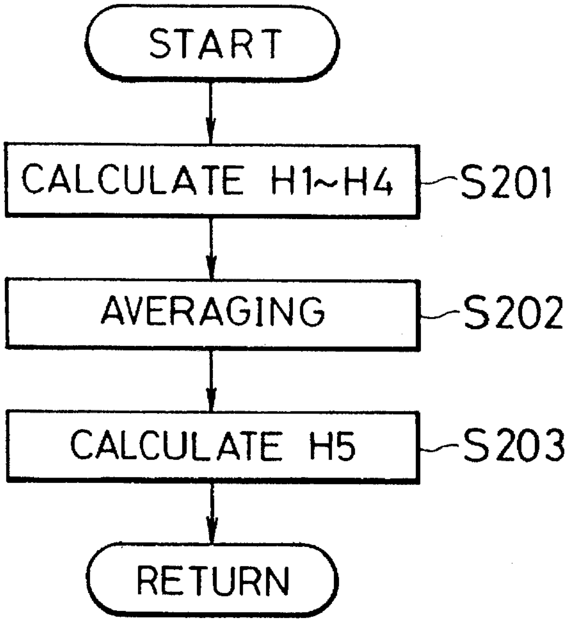
FIG. 2 is a flowchart showing a routine for calculating a determination parameter of an air density according to an embodiment of the present invention.

Then, the program goes to S112 where a subroutine shown in FIG. 2 is carried out to produce a determination parameter H5 for determining an actual air density. In S201 of this subroutine the approximation parameters H1, H2, H3 and H4 as shown in following formulas (2) through (5) are calculated. With respect to the approximation parameters, it is necessary to calculate at least two ones among H1, H2, H3 and H4.

$$H1=TPM1^n/ALPM1^m \quad (2)$$

$$H2=TPM2^n/ALPM2^m \quad (3)$$

$$H3=TPM1^n/ALPM2^m \quad (4)$$

$$H4=TPM2^n/ALPM1^m \quad (5)$$

where n and m are integers.

In the above formulas, H1 is a ratio of the "n"th power of the average basic fuel injectin amount TPM1 versus the "m"th power of the average throttle opening angle ALPM1, when the engine is in the first predetermined condition. Similarly, H2 is a ratio of the "n"th power of the average basic fuel injectin amount TPM2 versus the "m"th power of the average throttle opening angle ALPM2, when the engine is in the second predetermined condition. Further, H3 is a ratio of the "n"th power of the average basic fuel injectin amount TPM1 at the first predetermined condition versus the "m"th power of the average throttle opening angle ALPM2 at the second predetermined condition. Further similarly, H4 is a ratio of the "n"th power of the average basic fuel injectin amount TPM2 at the second predetermined condition versus the "m"th power of the average throttle opening angle ALPM1 at the first predetermined condition.

Each of above approximation parameters themselves represents a value corresponding to the actual air density, therefore these values can be used for determining an air density or judging a high altitude condition. However, in this embodiment of the present invention in order to raise a precision of determination, a parameter H5 (determination parameter) denoting a weighted mean of H1, H2, H3 and H4 is calculated at S202 according to the following equation (6).

$$H5=(H1\times m_1+H2\times m_2+H3\times m_3+H4\times m_4)/(m_1+m_2+m_3+m_4) \quad (6)$$

where $m_1$, $m_2$, $m_3$ and $m_4$ are a weight factor respectively.

Figure 3:
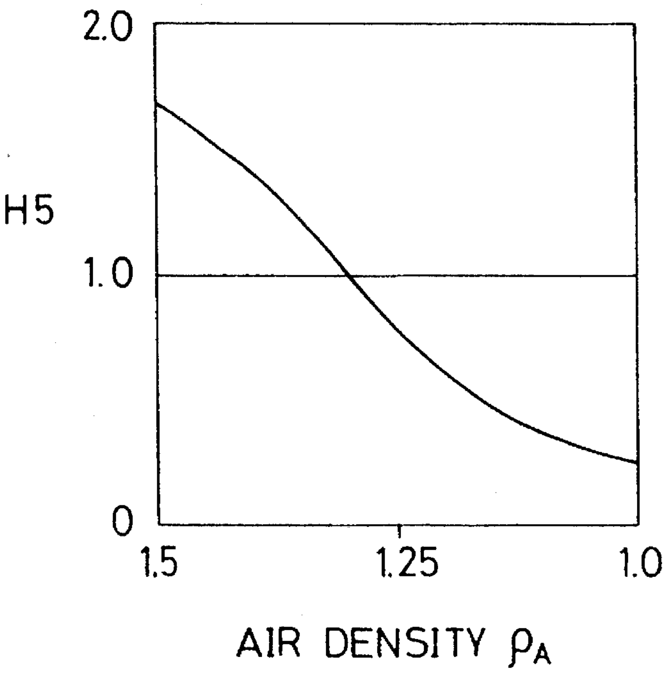
FIG. 3 is a diagram showing a relationship between determination parameter of an air density and an actual air density.

It has been experimentally confirmed that the determination parameter H5 thus obtained has such a relationship with the actual air density $\rho_A$ as shown in FIG. 3. The actual air density $\rho_A$ can be estimated by referring to a map memorizing this relationship in the ROM 27 or by calculating a formula which represents this relationship.

For example, in calculating the determination parameter H5 using the approximation parameters H2 and H3, when setting n=3 and m=1 in formulas (3) and (4), H2 and H3 are:

$$H2=TPM2^3/ALPM2 \quad (7)$$

$$H3=TPM1^3/ALPM2 \quad (8)$$

Further, when setting $m_2$=6 and $m_3$ =1 in the formula (6), a determination parameter H5 is calculated as follows:

$$H5=(H2\times 6+H3\times 1)/7 \quad (9)$$

After the determination parameter H5 is calculated, at S113 the cumulative time T1 and T2 are reset (set to be 0). Then the program steps to S114 where the actual air density $\rho_A$ is determined by referring to the map or by calculating the formula.

Since the fuel injection amount is controlled according to the air density $\rho_A$ thus obtained, the engine is always operated properly in any altitude without causing a poor performance, a poor fuel economy or hard engine startings.

Instead of determining the actual air density $\rho_A$ at S114, a threshold may be established in the determination parameter H5 in order to use the threshold from which the vehicle is judged to be operated in high altitude.

In summary, since the air density determining method according to the present invention can always provide an accurate air density without employing a costly altitude sensor, a low cost and highly reliable engine control system can be obtained.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A method of determining the air density of intake air admitted to an operating automotive engine, said engine including an electronically controlled fuel injection system and a throttle valve for adjusting an amount of said intake air, the method comprising:

operating said engine in a vehicle;

detecting a first predetermined operating condition composed of a plurality of engine and vehicle operating conditions;

counting a first detecting time during which said first predetermined operating condition is detected;

detecting a first fuel injection amount each time said first predetermined operating condition is detected and accumulating said first fuel injection amount;

detecting a first throttle opening degree each time said first predetermined operating condition is detected and accumulating said first throttle opening degree;

detecting a second predetermined operating condition composed of a plurality of engine and vehicle operating conditions some or all of which are different from engine and vehicle operating conditions of said first predetermined operating condition;

counting a second detecting time during which said second predetermined operating condition is detected;

detecting a second fuel injection amount each time said second predetermined operating condition is detected and accumulating said second fuel injection amount;

detecting a second throttle opening degree each time said second predetermined operating condition is detected and accumulating said second throttle opening degree;

obtaining a first average fuel injection amount by means of dividing said accumulated first fuel injection amount by said first detecting time when both of said first detecting time and said second detecting time reach a predetermined time;

obtaining a first average fuel throttle opening degree by means of dividing said accumulated first throttle opening degree by said first detecting time when both of said first detecting time and said second detecting time reach a predetermined time;

obtaining a second average fuel injection amount by means of dividing said accumulated second fuel injection amount by said second detecting time when both of said first detecting time and second detecting time reach a predetermined time;

obtaining a second average throttle opening degree by means of dividing said accumulated second throttle opening degree by said second detecting time when both of said first detecting time and second detecting time reach a predetermined time;

calculating a first parameter which is a ratio of said first average fuel injection amount versus said first average throttle opening angle;

calculating a second parameter which is a ratio of said second average fuel injection amount versus said second average throttle opening angle;

calculating a third parameter which is a ratio of said first average fuel injection amount versus said second average throttle opening angle;

calculating a fourth parameter which is a ratio of said second average fuel injection amount versus said first average throttle opening angle;

calculating a determination parameter which is a weighted mean of said first parameter, said second parameter, said third parameter and said fourth parameter by multiplying an appropriate weight factor to each of said first, second, third and fourth parameters respectively; and determining air density of induction air by referring to a map parameterizing said air density and said determination parameter and controlling the amount of fuel injection based on said air density by changing the amount of fuel injection according to said air density.

2. The method according to claim 1, further comprising calculating a predetermined "n"th power of said first average fuel injection amount;

computing a predetermined "m"th power of said first average throttle opening degree; and said first parameter is a ratio of said "n"th power and said "m"th power.

3. The method according to claim 1, further comprising calculating a predetermined "n"th power of said second average fuel injection amount;

computing a predetermined "m"th power of said second average throttle opening degree; and said second parameter calculation includes a ratio of the "n"th power of said second average fuel injection amount versus the "m"th power of said second average throttle opening degree.

4. The method according to claim 1, further comprising calculating a predetermined "n"th power of said first average fuel injection amount;

computing a predetermined "m"th power of said second average throttle opening degree; and said third parameter calculation includes a ratio of the "n"th power of said first average fuel injection amount versus the "m"th power of said second average throttle opening degree.

5. The method according to claim 1 further comprising calculating a predetermined "n"th power of said second average fuel injection amount;

computing a predetermined "m"th power of said first average throttle opening degree; and said fourth parameter calculation includes a ratio of the "n"th power of said second average fuel injection amount versus the "m"th power of said first average throttle opening degree.

6. The method according to claim 1, wherein said determination parameter calculation is based on at least two parameters among said first, second, third and fourth parameters.

7. A method of judging whether an engine is operated at a high altitude by determining the air density of intake air admitted to said engine having, an electronically controlled fuel injection system and a throttle valve for adjusting an amount of said intake air, the method comprising:

operating said engine in a vehicle;

detecting a first predetermined operating condition composed of a plurality of engine and vehicle operating conditions;

counting a first detecting time during which said first predetermined operating condition is detected;

detecting a first fuel injection amount each time said first predetermined operating condition is detected and accumulating said first fuel injection amount;

detecting a first throttle opening degree each time said first predetermined operating condition is detected and accumulating said first throttle opening degree;

detecting a second predetermined operating condition composed of a plurality of engine and vehicle operating conditions some or all of which are different from engine and vehicle operating conditions of said first predetermined operating condition;

counting a second detecting time during which said second predetermined operating condition is detected;

detecting a second fuel injection amount each time said second predetermined operating condition is detected and accumulating said second fuel injection amount;

detecting a second throttle opening degree each time said second predetermined operating condition is detected and accumulating said second throttle opening degree;

obtaining a first average fuel injection amount by means of dividing said accumulated first fuel injection amount by said first detecting time when both of said first detecting time and said second detecting time reach a predetermined time;

obtaining a first average throttle opening degree by means of dividing said accumulated first throttle opening degree by said first detecting time when both of said first detecting time and said second detecting time reach a predetermined time;

obtaining a second average fuel injection amount by means of dividing said accumulated second fuel injection amount by said second detecting time when both of said first detecting time and said second detecting time reach a predetermined time;

obtaining a second average throttle opening degree by means of dividing said accumulated second throttle opening degree by said second detecting time when both of said first detecting time and said second detecting time reach a predetermined time;

calculating a first parameter which is a ratio of said first average fuel injection amount versus said first average throttle opening angle;

calculating a second parameter which is a ratio of said second average fuel injection amount versus said second average throttle opening angle;

calculating a third parameter which is a ratio of said first average fuel injection amount versus said second average throttle opening angle;

calculating a fourth parameter which is a ratio of said second average fuel injection amount versus said first average throttle opening angle;

calculating a determination parameter which is a weighted mean of said first parameter, said second parameter, said third parameter and said fourth parameter by multiplying an appropriate weight factor to each of said first, second, third and fourth parameters respectively; and judging whether said engine is operated at a higher altitude from a relationship of said determination parameter with an altitude in which said engine is operated and controlling said amount of fuel injection based on said determination parameter by changing said amount of fuel injection according to said determination parameter.

8. The method according to claim 7, wherein said first parameter calculation includes a ratio of the "n"th power of said first average fuel injection amount versus the "m"th power of said first average throttle opening degree.

9. The method according to claim 7, wherein said second parameter calculation includes a ratio of the "n"th power of said second average fuel injection amount versus the "m"th power of said second average throttle opening degree.

10. The method according to claim 7, wherein said third parameter calculation includes a ratio of the "n"th power of said first average fuel injection amount versus the "m"th power of said second average throttle opening degree.

11. The method according to claim 7, wherein said fourth parameter calculation includes a ratio of the "n"th power of said second average fuel injection amount versus the "m"th power of said first average throttle opening degree.

12. The method according to claim 7, wherein said determination parameter calculation is based on at least two parameters among said first, second, third and fourth parameters.

* * * * *